United States Patent
Hatase et al.

(10) Patent No.: US 12,509,764 B2
(45) Date of Patent: Dec. 30, 2025

(54) THIN-FILM FORMING RAW MATERIAL USED IN ATOMIC LAYER DEPOSITION METHOD, AND METHOD OF PRODUCING THIN-FILM

(71) Applicant: ADEKA CORPORATION, Tokyo (JP)

(72) Inventors: Masako Hatase, Tokyo (JP); Chiaki Mitsui, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 80 days.

(21) Appl. No.: 18/026,488

(22) PCT Filed: Sep. 8, 2021

(86) PCT No.: PCT/JP2021/032956
§ 371 (c)(1),
(2) Date: Mar. 15, 2023

(87) PCT Pub. No.: WO2022/059571
PCT Pub. Date: Mar. 24, 2022

(65) Prior Publication Data
US 2023/0349039 A1    Nov. 2, 2023

(30) Foreign Application Priority Data

Sep. 17, 2020  (JP) ................ 2020-155927

(51) Int. Cl.
*C23C 16/18*  (2006.01)
*C23C 16/455* (2006.01)
*C23C 16/52*  (2006.01)

(52) U.S. Cl.
CPC ........ *C23C 16/18* (2013.01); *C23C 16/45527* (2013.01); *C23C 16/45553* (2013.01); *C23C 16/52* (2013.01)

(58) Field of Classification Search
CPC ............. C23C 16/18; C23C 16/45527; C23C 16/45553; C23C 16/52
See application file for complete search history.

(56) References Cited

U.S. PATENT DOCUMENTS

| 5,837,321 A | 11/1998 | Timmer et al. |
| 2002/0042165 A1* | 4/2002 | Putkonen .......... H01L 21/28211 438/142 |

(Continued)

FOREIGN PATENT DOCUMENTS

| CN | 110709381 | 1/2020 |
| JP | 2001-355070 | 12/2001 |

(Continued)

OTHER PUBLICATIONS

International Search Report issued Nov. 9, 2021 in International (PCT) Application No. PCT/JP2021/032956.

(Continued)

*Primary Examiner* — Michael G Miller
(74) *Attorney, Agent, or Firm* — Wenderoth, Lind & Ponack, L.L.P.

(57) ABSTRACT

Provided is a thin-film forming raw material, which is used in an atomic layer deposition method, including an yttrium compound represented by the following general formula (1):

$$\left( Y \underset{O}{\overset{O}{\diagup\hspace{-0.5em}\diagdown}} \underset{R^2}{\overset{R^1}{\diagdown\hspace{-0.5em}\diagup}} R^3 \right)_3 \quad (1)$$

(Continued)

where $R^1$ represents a secondary alkyl group having 3 to 8 carbon atoms, $R^2$ represents a tertiary alkyl group having 4 to 8 carbon atoms, and $R^3$ represents a hydrogen atom, or a primary, secondary, or tertiary alkyl group having 1 to 5 carbon atoms.

2 Claims, 4 Drawing Sheets

(56) References Cited

U.S. PATENT DOCUMENTS

| | | |
|---|---|---|
| 2003/0215996 A1 | 11/2003 | Putkonen |
| 2005/0020092 A1 | 1/2005 | Putkonen |
| 2008/0014762 A1 | 1/2008 | Putkonen |
| 2010/0266751 A1 | 10/2010 | Putkonen |
| 2011/0165328 A1 | 7/2011 | Clark |

FOREIGN PATENT DOCUMENTS

| | | |
|---|---|---|
| TW | 567584 | 12/2003 |
| WO | 2019/051302 | 3/2019 |

OTHER PUBLICATIONS

Rees et al., "Organometallic Chemical Vapor Deposition: the Roles of Precursor Design and Growth Ambient in Film Properties", Materials Research Society Symposium Proceedings, 1995, vol. 363, pp. 195-206.

\* cited by examiner

THIN-FILM FORMING RAW MATERIAL USED IN ATOMIC LAYER DEPOSITION METHOD, AND METHOD OF PRODUCING THIN-FILM

TECHNICAL FIELD

The present invention relates to a thin-film forming raw material, which is used in an atomic layer deposition method, including an yttrium compound having a specific structure, and to a method of producing a thin-film including using the raw material.

BACKGROUND ART

Yttrium has been used as a component for forming a compound semiconductor. Various raw materials have been reported as thin-film forming raw materials for producing thin-films each containing an yttrium atom.

Examples of a method of producing a thin-film include: a sputtering method; an ion plating method; a metal organic decomposition (MOD) method, such as a coating thermal decomposition method or a sol-gel method; a chemical vapor deposition (CVD) method; and an atomic layer deposition (ALD) method. Of those, the ALD method is an optimum production process for a thin-film because the method has, for example, the following many advantages: the method is excellent in composition controllability and step coverage; the method is suitable for mass production; and the method enables hybrid integration.

There have been reported various materials that may be used in vapor phase thin-film formation methods, such as the CVD method and the ALD method. A thin-film forming raw material applicable to the ALD method needs to have a temperature region called an ALD window, and the temperature region needs to be sufficiently wide. Accordingly, it is common general technical knowledge in the art that even a thin-film forming raw material that may be used in the CVD method may not be suitable for the ALD method in many cases.

In Non Patent Document 1, there is a disclosure of a raw material for a CVD method including tris(2,2,7-trimethyl-3,5-octanedionato) yttrium as a main component. In addition, in Patent Document 1, as an yttrium compound that may be used in the ALD method, there is a disclosure of tris(2,2,6,6-tetramethyl-3,5-heptanedionato) yttrium.

CITATION LIST

Patent Document

Patent Document 1: JP 2001-355070 A

Non Patent Document

Non Patent Document 1: Materials Research Society Symposium Proceedings, Volume: 363, Pages: 195-206, 1995

SUMMARY OF INVENTION

Technical Problem

In Non Patent Document 1, however, there is no description concerning the ALD method, and there is no description as to whether or not tris(2,2,7-trimethyl-3,5-octanedionato) yttrium is applicable to the ALD method. In addition, a thin-film forming raw material for an ALD method is required to have a low melting point, to be excellent in thermal stability, and to enable high-productivity production of a high-quality thin-film reduced in residual carbon content. However, tris(2,2,6,6-tetramethyl-3,5-heptanedionato) yttrium described in Patent Document 1 has been unable to satisfy those requirements. Further, in Patent Document 1, there is completely no description of a specific example in which an yttrium compound except tris(2,2,6,6-tetramethyl-3,5-heptanedionato) yttrium is applied to the ALD method.

Accordingly, an object of the present invention is to provide a thin-film forming raw material, which is used in an atomic layer deposition method, the raw material having a low melting point, being excellent in thermal stability, and enabling high-productivity production of a high-quality thin-film reduced in residual carbon content, and a method of producing a thin-film including using the raw material.

Solution to Problem

The inventors of the present invention have carried out investigations and found that the above-mentioned problems can be solved by a thin-film forming raw material, which is used in an atomic layer deposition method, including an yttrium compound having a specific structure, to reach the present invention.

That is, the present invention relates to a thin-film forming raw material, which is used in an atomic layer deposition method, including an yttrium compound represented by the following general formula (1):

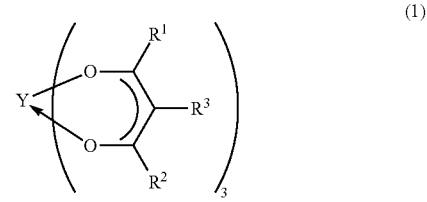

where $R^1$ represents a secondary alkyl group having 3 to 8 carbon atoms, $R^2$ represents a tertiary alkyl group having 4 to 8 carbon atoms, and $R^3$ represents a hydrogen atom, or a primary, secondary, or tertiary alkyl group having 1 to 5 carbon atoms.

The present invention also relates to a method of producing a thin-film containing an yttrium atom on a surface of a substrate by an atomic layer deposition method, the method including the steps of: causing the yttrium compound in a raw material gas, which is obtained by vaporizing the thin-film forming raw material, which is used in an atomic layer deposition method, to adsorb to the surface of the substrate to form a precursor thin-film; and causing the precursor thin-film to react with a reactive gas to form the thin-film containing an yttrium atom on the surface of the substrate.

Advantageous Effects of Invention

According to the present invention, there can be provided the thin-film forming raw material, which is used in an atomic layer deposition method, the raw material having a low melting point, being excellent in thermal stability, and enabling high-productivity production of a high-quality thin-film reduced in residual carbon content. In addition, according to the present invention, there can be provided the method of producing a high-quality thin-film reduced in residual carbon content with high productivity by an atomic layer deposition method.

DESCRIPTION OF EMBODIMENTS

Figure 1:
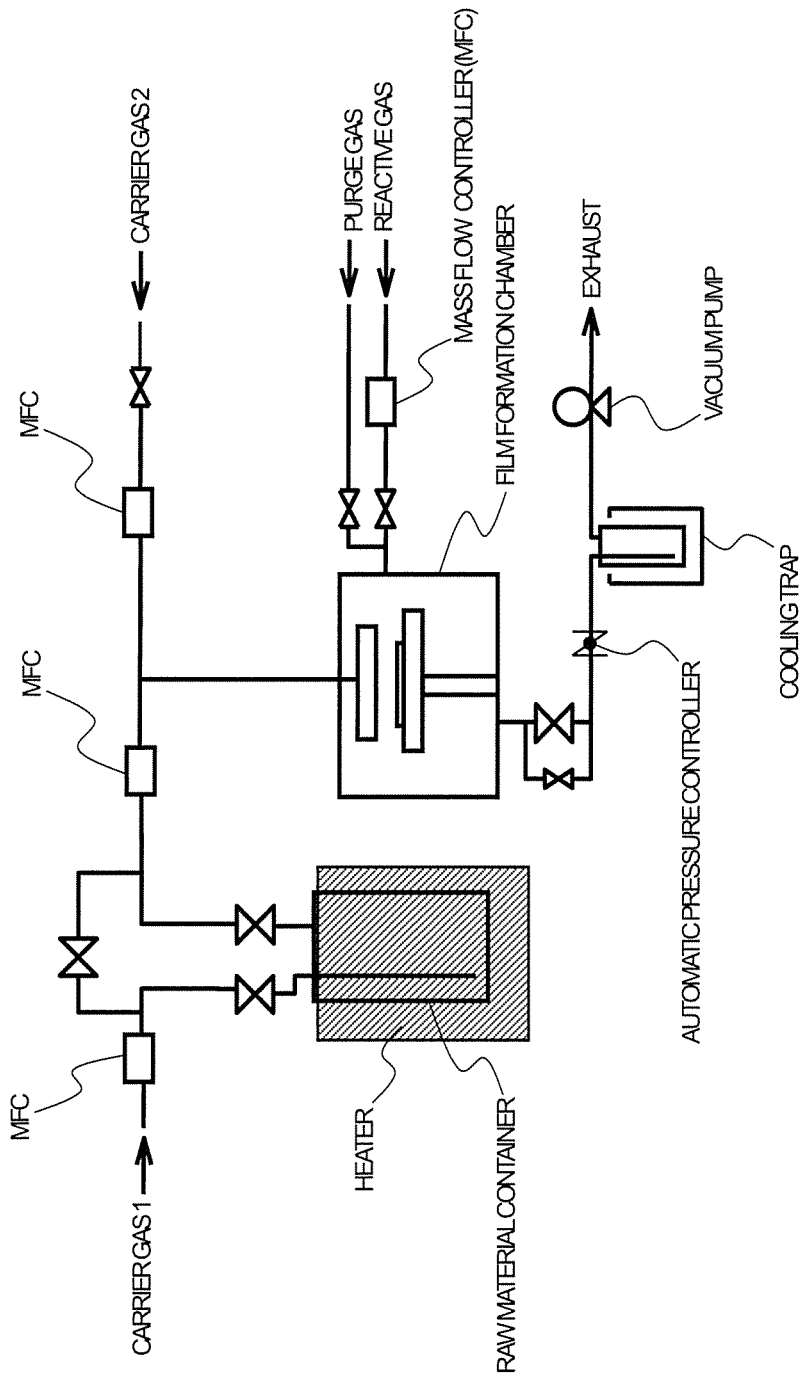
FIG. 1 is a schematic diagram for illustrating an example of an apparatus for an atomic layer deposition method to be used in a method of producing a thin-film according to the present invention.

A thin-film forming raw material, which is used in an atomic layer deposition method, of the present invention includes an yttrium compound represented by the general formula (1).

In the general formula (1), $R^1$ represents a secondary alkyl group having 3 to 8 carbon atoms, $R^2$ represents a tertiary alkyl group having 4 to 8 carbon atoms, and $R^3$ represents a hydrogen atom, or a primary, secondary, or tertiary alkyl group having 1 to 5 carbon atoms.

Examples of the secondary alkyl group having 3 to 8 carbon atoms include an isopropyl group, a sec-butyl group, a 1-ethylpropyl group, a 1,2-dimethylpropyl group, a sec-pentyl group, a hexan-3-yl group, a hexan-2-yl group, a heptan-3-yl group, a heptan-2-yl group, an octan-4-yl group, an octan-3-yl group, and an octan-2-yl group.

Examples of the tertiary alkyl group having 4 to 8 carbon atoms include a tert-butyl group, a tert-pentyl group, a 2-methylpentan-2-yl group, a 3-methylpentan-3-yl group, a 2-methylhexan-2-yl group, and a 2-methylheptan-2-yl group.

Examples of the primary, secondary, or tertiary alkyl group having 1 to 5 carbon atoms include a methyl group, an ethyl group, a propyl group, an isopropyl group, a butyl group, an isobutyl group, a sec-butyl group, a tert-butyl group, a pentyl group, a 1-ethylpropyl group, a 1,2-dimethylpropyl group, a sec-pentyl group, and a tert-pentyl group.

A compound represented by the general formula (1) in which $R^1$ represents a secondary alkyl group having 5 to 8 carbon atoms is preferred because the following effects are specifically high: a low melting point; high thermal stability; and a formation of a thin-film containing yttrium with high productivity. Of such compounds, a compound in which $R^1$ represents a secondary alkyl group having 7 carbon atoms is particularly preferred because those effects are particularly high.

A compound represented by the general formula (1) in which $R^2$ represents a tertiary alkyl group having 4 or 5 carbon atoms is preferred because the thermal stability is high. Of such compounds, a compound in which $R^2$ represents a tert-butyl group is particularly preferred because the thermal stability is particularly high.

A compound represented by the general formula (1) in which $R^3$ represents a hydrogen atom, or an alkyl group having 1 to 3 carbon atoms is preferred because the effect by which a thin-film containing yttrium can be formed with high productivity is high. Of such compounds, a compound in which $R^3$ represents a hydrogen atom is particularly preferred because the effect by which a thin-film containing yttrium can be formed with high productivity is particularly high.

A compound represented by the general formula (1) in which the sum of the numbers of carbon atoms of $R^1$ and $R^2$ is from 10 to 13 is preferred because the following effects are high: a low melting point; high thermal stability; and a formation of a thin-film containing yttrium with high productivity.

Specific examples of the yttrium compound represented by the general formula (1) include Yttrium Compounds No. 1 to No. 20 below. In Yttrium Compounds No. 1 to No. 20 below, "Me" represents a methyl group, "iPr" represents an isopropyl group, "sBu" represents a sec-butyl group, "tBu" represents a tert-butyl group, "tAm" represents a tert-pentyl group (group represented by the following formula (2)), "Hep" represents a heptan-3-yl group (group represented by the following formula (3)), "Hex" represents a hexan-3-yl group (group represented by the following formula (4)), and "Oct" represents an octan-4-yl group (group represented by the following formula (5)).

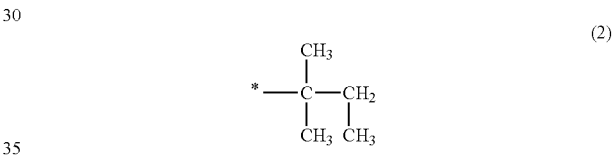

(2)

where * represents a bonding site.

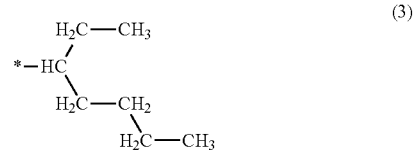

(3)

where * represents a bonding site.

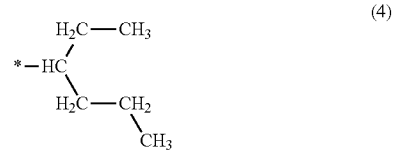

(4)

where * represents a bonding site.

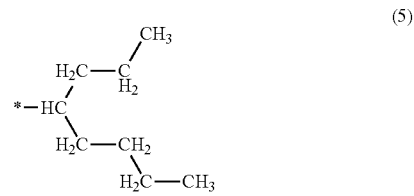 [SMILES: *C(CCC)CCCC]

(5)

where * represents a bonding site.

No.1 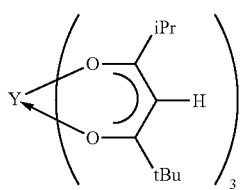
No.2 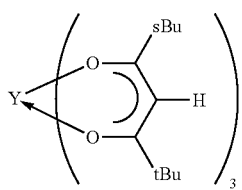
No.3 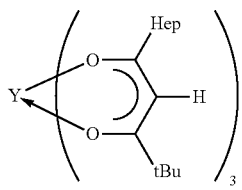
No.4 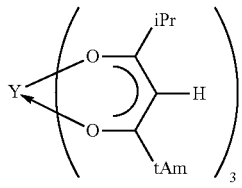
No.5 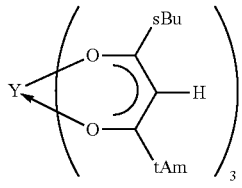
No.6 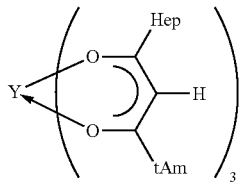
No.7 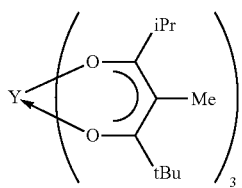
No.8 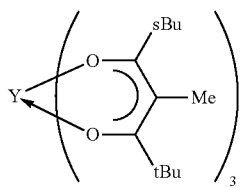
-continued
No.9 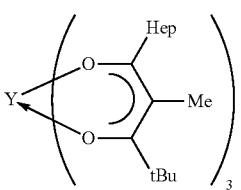
No.10 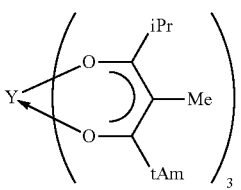
No.11 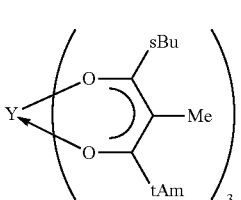
No.12 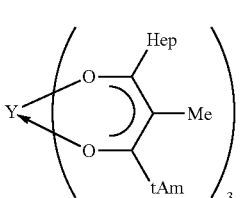
No.13 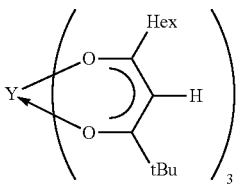
No.14 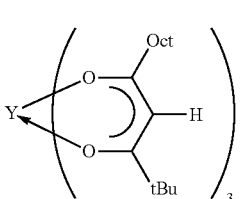
No.15 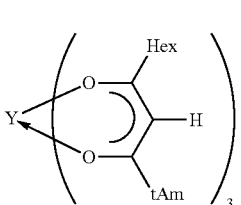
No.16

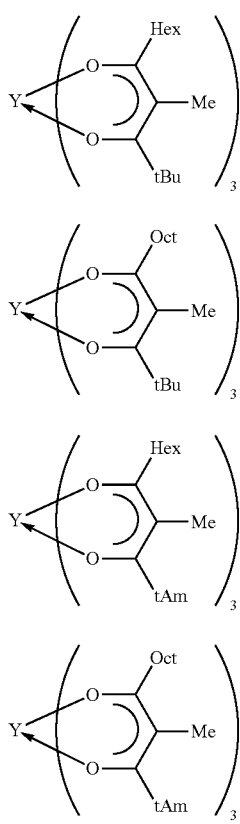

A method of producing the yttrium compound represented by the general formula (1) is not particularly limited, and the compound may be produced by a well-known synthesis method. The compound may be produced by, for example, causing yttrium nitrate hexahydrate, a dione compound having a corresponding structure, and sodium hydroxide to react with each other under a methanol solvent. Specifically, Compound No. 3 may be produced by causing yttrium nitrate hexahydrate, 2,2-dimethyl-6-ethyl-3,5-decanedione, and sodium hydroxide to react with each other under a methanol solvent.

It is only required that the thin-film forming raw material, which is used in an atomic layer deposition method, of the present invention include the yttrium compound represented by the general formula (1), and the composition thereof varies depending on the kind of an intended thin-film. For example, when a thin-film containing only yttrium as a metal is produced, the thin-film forming raw material, which is used in an atomic layer deposition method, of the present invention is free of a metal compound other than the yttrium compound represented by the general formula (1) and a semimetal compound. Meanwhile, when a thin-film containing yttrium and a metal other than yttrium and/or a semimetal is produced, the thin-film forming raw material, which is used in an atomic layer deposition method, of the present invention may include a compound containing a metal other than yttrium and/or a compound containing a semimetal (hereinafter sometimes referred to as "other precursor") in addition to the yttrium compound represented by the general formula (1). The thin-film forming raw material, which is used in an atomic layer deposition method, of the present invention may further include an organic solvent and/or a nucleophilic reagent as described later.

The form of the thin-film forming raw material, which is used in an atomic layer deposition method, of the present invention is appropriately selected by an approach such as the transportation and supply method of the atomic layer deposition method to be used.

The above-mentioned transportation and supply method comes in the following kinds: a gas transportation method including performing heating and/or decompression in a container in which the thin-film forming raw material, which is used in an atomic layer deposition method, of the present invention is stored (hereinafter sometimes simply described as "raw material container") to vaporize the raw material, to thereby provide a raw material gas, and introducing the raw material gas into a film formation chamber in which a substrate is placed (hereinafter sometimes described as "deposition reaction portion") together with a carrier gas, such as argon, nitrogen, or helium, to be used as required; and a liquid transportation method including transporting the thin-film forming raw material, which is used in an atomic layer deposition method, of the present invention in a liquid or solution state to a vaporization chamber, performing heating and/or decompression in the vaporization chamber to vaporize the raw material, to thereby provide a raw material gas, and introducing the raw material gas into the film formation chamber. In the case of the gas transportation method, the very yttrium compound represented by the general formula (1) may be used as the thin-film forming raw material, which is used in an atomic layer deposition method. In the case of the liquid transportation method, the very yttrium compound represented by the general formula (1) or a solution obtained by dissolving the yttrium compound in an organic solvent may be used as the thin-film forming raw material, which is used in an atomic layer deposition method. Such thin-film forming raw material, which is used in an atomic layer deposition method, may further include, for example, any other precursor or a nucleophilic reagent.

In addition, a multi-component ALD method comes in: a method including independently vaporizing and supplying each component of the thin-film forming raw material, which is used in an atomic layer deposition method (hereinafter sometimes described as "single source method"); and a method including vaporizing and supplying a mixed raw material obtained by mixing multi-component raw materials in accordance with desired composition in advance (hereinafter sometimes described as "cocktail source method"). In the case of the cocktail source method, a mixture of the yttrium compound represented by the general formula (1) and any other precursor, or a mixed solution obtained by dissolving the mixture in an organic solvent may be used as the thin-film forming raw material, which is used in an atomic layer deposition method. The mixture or the mixed solution may further include, for example, a nucleophilic reagent.

A well-known general organic solvent may be used as the above-mentioned organic solvent without particular limitation. Examples of the organic solvent include: acetic acid esters, such as ethyl acetate, butyl acetate, and methoxyethyl acetate; ethers, such as tetrahydrofuran, tetrahydropyran, ethylene glycol dimethyl ether, diethylene glycol dimethyl ether, triethylene glycol dimethyl ether, dibutyl ether, and dioxane; ketones, such as methyl butyl ketone, methyl isobutyl ketone, ethyl butyl ketone, dipropyl ketone, diisobutyl ketone, methyl amyl ketone, cyclohexanone, and methylcyclohexanone; hydrocarbons, such as hexane, cyclohexane, methylcyclohexane, dimethylcyclohexane, ethylcyclohexane, heptane, octane, toluene, and xylene; hydrocarbons each having a cyano group, such as 1-cyanopropane, 1-cyanobutane, 1-cyanohexane, cyanocyclohexane, cyanobenzene, 1,3-dicyanopropane, 1,4-dicyanobutane, 1,6-dicyanohexane, 1,4-dicyanocyclohexane, and 1,4-dicyanobenzene; pyridine; and lutidine. Those organic solvents may be used alone or as a mixture thereof in accordance with the solubility of a solute, a relationship among a use temperature, a boiling point, and a flash point, and the like.

In addition, in the case of the multi-component ALD method, the other precursor to be used together with the yttrium compound represented by the general formula (1) is not particularly limited, and a well-known general precursor used in a thin-film forming raw material, which is used in an atomic layer deposition method, may be used.

Examples of the other precursor include compounds formed of: one kind or two or more kinds of compounds selected from the group consisting of compounds to be used as organic ligands, such as an alcohol compound, a glycol compound, a β-diketone compound, a cyclopentadiene compound, and an organic amine compound; and silicon or metals. In addition, examples of the kind of the metal in the precursor include lithium, sodium, potassium, calcium, strontium, barium, titanium, zirconium, hafnium, vanadium, niobium, tantalum, chromium, molybdenum, tungsten, manganese, iron, ruthenium, cobalt, rhodium, iridium, nickel, palladium, platinum, copper, silver, gold, zinc, aluminum, gallium, indium, germanium, tin, lead, antimony, bismuth, scandium, ruthenium, yttrium, lanthanum, cerium, praseodymium, neodymium, promethium, samarium, europium, gadolinium, terbium, dysprosium, holmium, erbium, thulium, ytterbium, and lutetium.

Examples of the alcohol compound to be used as the organic ligand in the above-mentioned other precursor include: alkyl alcohols, such as methanol, ethanol, propanol, isopropyl alcohol, butanol, sec-butyl alcohol, isobutyl alcohol, tert-butyl alcohol, pentyl alcohol, isopentyl alcohol, and tert-pentyl alcohol; ether alcohols, such as 2-methoxyethanol, 2-ethoxyethanol, 2-butoxyethanol, 2-(2-methoxyethoxy) ethanol, 2-methoxy-1-methylethanol, 2-methoxy-1,1-dimethylethanol, 2-ethoxy-1,1-dimethylethanol, 2-isopropoxy-1,1-dimethylethanol, 2-butoxy-1,1-dimethylethanol, 2-(2-methoxyethoxy)-1,1-dimethylethanol, 2-propoxy-1,1-diethylethanol, 2-s-butoxy-1,1-diethylethanol, and 3-methoxy-1,1-dimethylpropanol; and dialkylamino alcohols, such as dimethylaminoethanol, ethylmethylaminoethanol, diethylaminoethanol, dimethylamino-2-pentanol, ethylmethylamino-2-pentanol, dimethylamino-2-methyl-2-pentanol, ethylmethylamino-2-methyl-2-pentanol, and diethylamino-2-methyl-2-pentanol.

Examples of the glycol compound to be used as the organic ligand in the above-mentioned other precursor include 1,2-ethanediol, 1,2-propanediol, 1,3-propanediol, 2,4-hexanediol, 2,2-dimethyl-1,3-propanediol, 2,2-diethyl-1,3-propanediol, 1,3-butanediol, 2,4-butanediol, 2,2-diethyl-1,3-butanediol, 2-ethyl-2-butyl-1,3-propanediol, 2,4-pentanediol, 2-methyl-1,3-propanediol, 2-methyl-2,4-pentanediol, 2,4-hexanediol, and 2,4-dimethyl-2,4-pentanediol.

Examples of the β-diketone compound to be used as the organic ligand in the above-mentioned other precursor include: alkyl-substituted β-diketones, such as acetylacetone, hexane-2,4-dione, 5-methylhexane-2,4-dione, heptane-2,4-dione, 2-methylheptane-3,5-dione, 5-methylheptane-2,4-dione, 6-methylheptane-2,4-dione, 2,2-dimethylheptane-3,5-dione, 2,6-dimethylheptane-3,5-dione, 2,2,6-trimethylheptane-3,5-dione, 2,2,6,6-tetramethylheptane-3,5-dione, octane-2,4-dione, 2,2,6-trimethyloctane-3,5-dione, 2,6-dimethyloctane-3,5-dione, 2,9-dimethylnonane-4,6-dione, 2-methyl-6-ethyldecane-3,5-dione, and 2,2-dimethyl-6-ethyldecane-3,5-dione; fluorine-substituted alkyl β-diketones, such as 1,1,1-trifluoropentane-2,4-dione, 1,1,1-trifluoro-5,5-dimethylhexane-2,4-dione, 1,1,1,5,5,5-hexafluoropentane-2,4-dione, and 1,3-diperfluorohexylpropane-1,3-dione; and ether-substituted β-diketones, such as 1,1,5,5-tetramethyl-1-methoxyhexane-2,4-dione, 2,2,6,6-tetramethyl-1-methoxyheptane-3,5-dione, and 2,2,6,6-tetramethyl-1-(2-methoxyethoxy) heptane-3,5-dione.

Examples of the cyclopentadiene compound to be used as the organic ligand in the above-mentioned other precursor include cyclopentadiene, methylcyclopentadiene, ethylcyclopentadiene, propylcyclopentadiene, isopropylcyclopentadiene, butylcyclopentadiene, sec-butylcyclopentadiene, isobutylcyclopentadiene, tert-butylcyclopentadiene, dimethylcyclopentadiene, and tetramethylcyclopentadiene.

Examples of the organic amine compound to be used as the organic ligand in the above-mentioned other precursor include methylamine, ethylamine, propylamine, isopropylamine, butylamine, sec-butylamine, tert-butylamine, isobutylamine, dimethylamine, diethylamine, dipropylamine, diisopropylamine, ethylmethylamine, propylmethylamine, and isopropylmethylamine.

The above-mentioned other precursor is known in the art, and a production method therefor is also known. An example of the production method is given below. For example, when the alcohol compound is used as the organic ligand, the precursor may be produced through a reaction between an inorganic salt of the metal described above or a hydrate thereof and an alkali metal alkoxide of the alcohol compound. In this case, examples of the inorganic salt of the metal or the hydrate thereof may include a halide and a nitrate of the metal, and examples of the alkali metal alkoxide may include a sodium alkoxide, a lithium alkoxide, and a potassium alkoxide.

In the case of the single source method, the above-mentioned other precursor is preferably a compound similar to the yttrium compound represented by the general formula (1) in behavior of thermal decomposition and/or oxidative decomposition. In the case of the cocktail source method, the other precursor is preferably a compound that not only is similar to the yttrium compound represented by the general formula (1) in behavior of thermal decomposition and/or oxidative decomposition, but also causes no alteration due to a chemical reaction or the like at the time of its mixing with the yttrium compound.

In addition, the thin-film forming raw material, which is used in an atomic layer deposition method, of the present invention may include a nucleophilic reagent for improving the stability of each of the yttrium compound represented by the general formula (1) and the other precursor as required. Examples of the nucleophilic reagent include: ethylene glycol ethers, such as glyme, diglyme, triglyme, and tetraglyme; crown ethers, such as 18-crown-6, dicyclohexyl-18-crown-6,24-crown-8, dicyclohexyl-24-crown-8, and dibenzo-24-crown-8; polyamines, such as ethylenediamine, N,N'-tetramethylethylenediamine, diethylenetriamine, triethylenetetramine, tetraethylenepentamine, pentaethylenehexamine, 1,1,4,7,7-pentamethyldiethylenetriamine, 1,1,4,7,10,10-hexamethyltriethylenetetramine, and triethoxytriethyleneamine; cyclic polyamines, such as cyclam and cyclen; heterocyclic compounds, such as pyridine, pyrrolidine, piperidine, morpholine, N-methylpyrrolidine, N-methylpiperidine, N-methylmorpholine, tetrahydrofuran, tetrahydropyran, 1,4-dioxane, oxazole, thiazole, and oxathiolane; β-ketoesters, such as methyl acetoacetate, ethyl acetoacetate, and 2-methoxyethyl acetoacetate; and β-diketones, such as acetylacetone, 2,4-hexanedione, 2,4-heptanedione, 3,5-heptanedione, and dipivaloylmethane. The usage amount of such nucleophilic reagent falls within the range of preferably from 0.1 mol to 10 mol, more preferably from 1 mol to 4 mol with respect to 1 mol of the total amount of the precursor.

The thin-film forming raw material, which is used in an atomic layer deposition method, of the present invention is prevented from containing impurity metal elements, impurity halogens such as impurity chlorine, and impurity organic substances except the components for forming the raw material to the extent possible. The content of each of the impurity metal elements is preferably 100 ppb or less, more preferably 10 ppb or less, and the total content thereof is preferably 1 ppm or less, more preferably 100 ppb or less. In particular, when the raw material is used as a gate insulating film, a gate film, or a barrier layer of an LSI, it is required to reduce the contents of alkali metal elements and alkaline-earth metal elements that influence the electrical characteristics of a thin-film to be obtained. The content of the impurity halogens is preferably 100 ppm or less, more preferably 10 ppm or less, most preferably 1 ppm or less. The total content of the impurity organic substances is preferably 500 ppm or less, more preferably 50 ppm or less, most preferably 10 ppm or less. In addition, moisture is responsible for the occurrence of particles in the thin-film forming raw material, which is used in an atomic layer deposition method, or the occurrence of particles during thin-film formation. Accordingly, moisture is desirably removed from each of the precursor, the organic solvent, and the nucleophilic reagent at the time of its use in advance to the extent possible in order that the moisture content thereof may be reduced. The moisture content of each of the precursor, the organic solvent, and the nucleophilic reagent is preferably 10 ppm or less, more preferably 1 ppm or less.

In addition, it is preferred that the thin-film forming raw material, which is used in an atomic layer deposition method, of the present invention be prevented from containing particles to the extent possible in order that the particle contamination of a thin-film to be formed may be reduced or prevented. Specifically, in particle measurement with a light scattering liquid particle detector in a liquid phase, it is preferred that the number of particles larger than 0.3 μm be 100 or less in 1 mL of the liquid phase, it is more preferred that the number of particles larger than 0.2 μm be 1,000 or less in 1 mL of the liquid phase, and it is most preferred that the number of particles larger than 0.2 μm be 100 or less in 1 mL of the liquid phase.

A method of producing a thin-film of the present invention is a method of producing a thin-film containing an yttrium atom on a surface of a substrate by an atomic layer deposition method, the method including the steps of: causing the yttrium compound in a raw material gas, which is obtained by vaporizing the thin-film forming raw material, which is used in an atomic layer deposition method, to adsorb to the surface of the substrate (to deposit the yttrium compound on the surface of the substrate) to form a precursor thin-film; and causing the precursor thin-film to react with a reactive gas to form the thin-film containing an yttrium atom on the surface of the substrate.

As a material for the substrate, there are given, for example: silicon; ceramics, such as silicon nitride, titanium nitride, tantalum nitride, titanium oxide, ruthenium oxide, zirconium oxide, hafnium oxide, and lanthanum oxide; glass; metals, such as metal cobalt, metal iron, metal manganese, metal nickel, and metal copper; and alloys, such as stainless steel, brass, cupronickel, bronze, duralumin, nichrome, stellite, solder, amalgam, and carbon steel. As a shape of the substrate, there are given, for example, a plate shape, a spherical shape, a fiber shape, and a scale-like shape. The surface of the substrate may be planar, or may have a three-dimensional structure such as a trench structure.

In addition, a method of introducing the raw material gas obtained by vaporizing the thin-film forming raw material, which is used in an atomic layer deposition method, into a film formation chamber in which the substrate is placed is, for example, the gas transportation method, the liquid transportation method, the single source method, or the cocktail source method described above.

Examples of the reactive gas include: oxidizing gases, including oxygen, ozone, nitrogen dioxide, nitrogen monoxide, water vapor, hydrogen peroxide, formic acid, acetic acid, and acetic anhydride; reducing gases, including hydrogen; and nitriding gases, including organic amine compounds, such as a monoalkylamine, a dialkylamine, a trialkylamine, and an alkylenediamine, hydrazine, and ammonia. Those reactive gases may be used alone or as a mixture thereof. The thin-film forming raw material, which is used in an atomic layer deposition method, of the present invention has such a property as to react with the oxidizing gases out of those gases at specifically low temperatures, and reacts particularly with ozone and water vapor at low temperatures. An oxidizing gas containing ozone, oxygen, or water vapor is preferably used as the reactive gas because a film thickness obtained per cycle is large, and hence a thin-film can be produced with high productivity, and an oxidizing gas containing ozone is more preferably used.

The production conditions further include a temperature and a pressure at the time of the production of the raw material gas by the vaporization of the thin-film forming raw material, which is used in an atomic layer deposition method. The step of vaporizing the thin-film forming raw material, which is used in an atomic layer deposition method, to provide the raw material gas may be performed in a raw material container, or may be performed in a vaporization chamber. In each case, the thin-film forming raw material, which is used in an atomic layer deposition method, of the present invention is preferably vaporized at from 0° C. to 300° C. In addition, when the thin-film forming raw material, which is used in an atomic layer deposition method, is vaporized in the raw material container or in the vaporization chamber to provide the raw material gas, each of a pressure in the raw material container and a pressure in the vaporization chamber is preferably from 1 Pa to 10,000 Pa.

In addition, although the production conditions in the method of producing a thin-film of the present invention are not particularly limited, for example, a reaction temperature (substrate temperature), a reaction pressure, and a deposition rate may be appropriately determined in accordance with a desired thickness of the thin-film and the kind thereof. The reaction temperature is preferably 100° C. or more, which is a temperature at which the thin-film forming raw material, which is used in an atomic layer deposition method, of the present invention sufficiently reacts with the reactive gas, and is more preferably from 150° C. to 400° C., and the raw material is used in an ALD window adapted to the reactive gas. The film thickness is controlled by the number of cycles so that a desired film thickness may be obtained.

The respective steps of the above-mentioned ALD method are described in detail below by taking a case in which an yttrium oxide thin-film is formed as an example. First, the raw material gas obtained by vaporizing the thin-film forming raw material, which is used in an atomic layer deposition method, is introduced into the film formation chamber (raw material introduction step). A preferred temperature and a preferred pressure at the time of the vaporization of the thin-film forming raw material, which is used in an atomic layer deposition method, fall within the range of from 0° C. to 300° C. and the range of from 1 Pa to 10,000 Pa, respectively. Next, the raw material gas introduced into the film formation chamber is caused to adsorb to (deposited on) the surface of the substrate to form the precursor thin-film on the surface of the substrate (precursor thin-film formation step). At this time, heat may be applied by heating the substrate or heating the film formation chamber. The temperature of the substrate when the step is performed is preferably from room temperature to 500° C., more preferably from 150° C. to 400° C. An ALD window when the thin-film forming raw material, which is used in an atomic layer deposition method, of the present invention and an oxidizing gas are used in combination roughly falls within the range of from 200° C. to 400° C. A pressure in the system (film formation chamber) when the step is performed is preferably from 1 Pa to 10,000 Pa, more preferably from 10 Pa to 1,000 Pa.

Next, the unreacted raw material gas and a by-product gas are evacuated from the film formation chamber (evacuation step). Although it is ideal to completely evacuate the unreacted raw material gas and the by-product gas from the film formation chamber, it is not necessarily needed to completely evacuate the gases. As an evacuation method, there are given, for example, a method including purging the inside of the system with an inert gas, such as nitrogen, helium, or argon, a method including performing evacuation by decompressing the inside of the system, and a combination of these methods. A decompression degree when the decompression is performed is preferably from 0.01 Pa to 300 Pa, more preferably from 0.01 Pa to 100 Pa.

Next, an oxidizing gas is introduced as the reactive gas into the film formation chamber, and the yttrium oxide thin-film is formed from the precursor thin-film formed in the previous precursor thin-film formation step by the action of the oxidizing gas or the actions of the oxidizing gas and heat (yttrium oxide thin-film formation step). A temperature when the heat is caused to act on the precursor thin-film in the step is preferably from room temperature to 500° C., more preferably from 150° C. to 400° C. The ALD window when the thin-film forming raw material, which is used in an atomic layer deposition method, of the present invention and the oxidizing gas are used in combination roughly falls within the range of from 200° C. to 400° C., and hence it is most preferred that the precursor thin-film be caused to react with the reactive gas in the range of from 200° C. to 400° C. The pressure in the system (film formation chamber) when the step is performed is preferably from 1 Pa to 10,000 Pa, more preferably from 10 Pa to 1,000 Pa. The thin-film forming raw material, which is used in an atomic layer deposition method, of the present invention has satisfactory reactivity with the oxidizing gas, and hence enables high-productivity production of a high-quality yttrium oxide thin-film reduced in residual carbon content.

In the method of producing a thin-film of the present invention, thin-film deposition by a series of operations formed of the raw material introduction step, the precursor thin-film formation step, the evacuation step, and the yttrium oxide thin-film formation step described above is defined as one cycle, and the cycle may be repeated a plurality of times until a thin-film having a required film thickness is obtained. In this case, after one cycle has been performed, the next one cycle is preferably performed after the evacuation of the unreacted reactive gas (when the yttrium oxide thin-film is formed, the oxidizing gas) and a by-product gas from the film formation chamber in the same manner as in the above-mentioned evacuation step.

In addition, in the method of producing a thin-film of the present invention, energy, such as plasma, light, or a voltage, may be applied, and a catalyst may be used. There is no particular limitation on the timing at which the energy is applied and the timing at which the catalyst is used. The energy may be applied or the catalyst may be used, for example, at the time of the introduction of the raw material gas in the raw material introduction step, at the time of the heating in the precursor thin-film formation step or the yttrium oxide thin-film formation step, at the time of the evacuation of the inside of the system in the evacuation step, or at the time of the introduction of the oxidizing gas in the yttrium oxide thin-film formation step, or between the above-mentioned respective steps.

In addition, in the method of producing a thin-film of the present invention, after the thin-film formation, annealing treatment may be performed in an inert atmosphere, an oxidizing atmosphere, or a reducing atmosphere in order that more satisfactory electrical characteristics may be obtained. When step embedding is required, a reflow step may be provided. A temperature in this case is from 200° C. to 1,500° C., preferably from 500° C. to 1,000° C.

Figure 2:
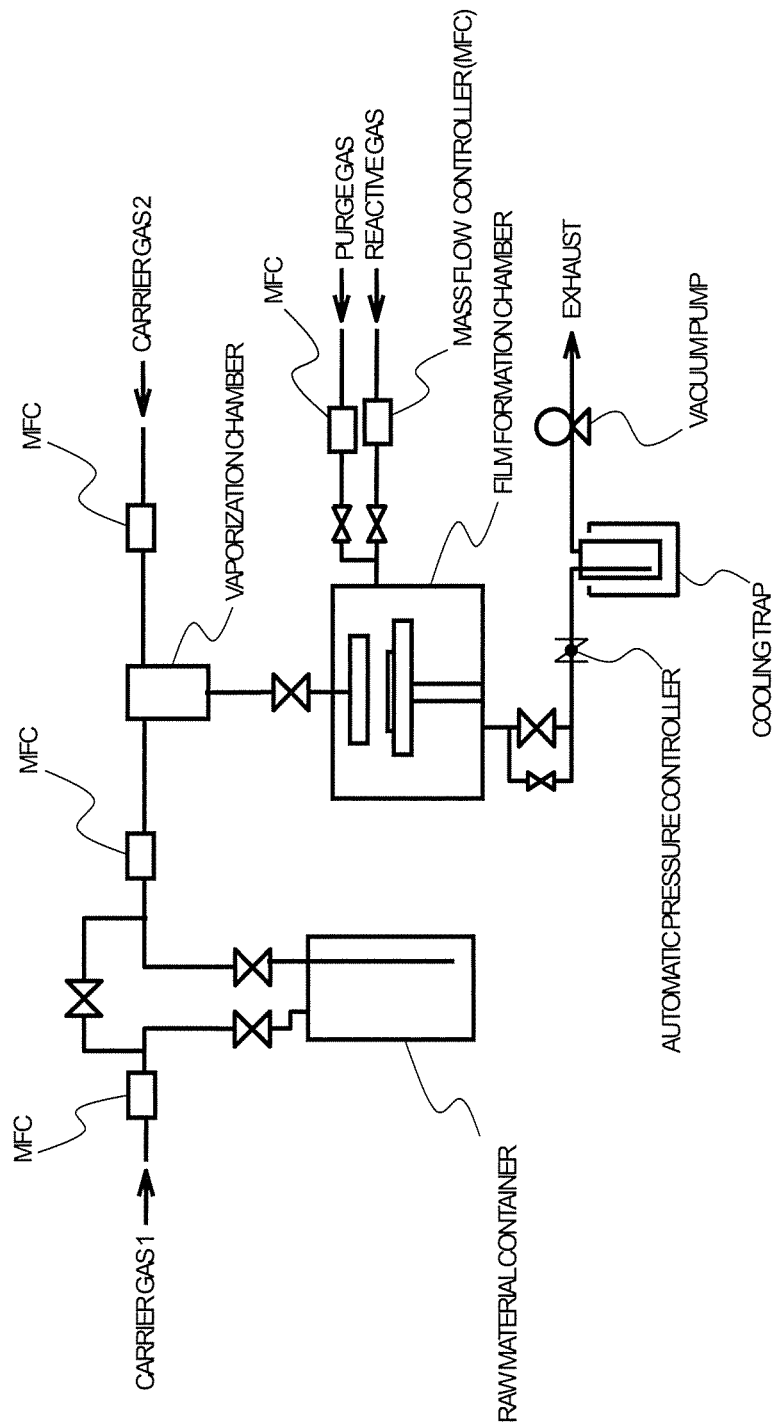
FIG. 2 is a schematic diagram for illustrating another example of the apparatus for an atomic layer deposition method to be used in the method of producing a thin-film according to the present invention.
Figure 3:
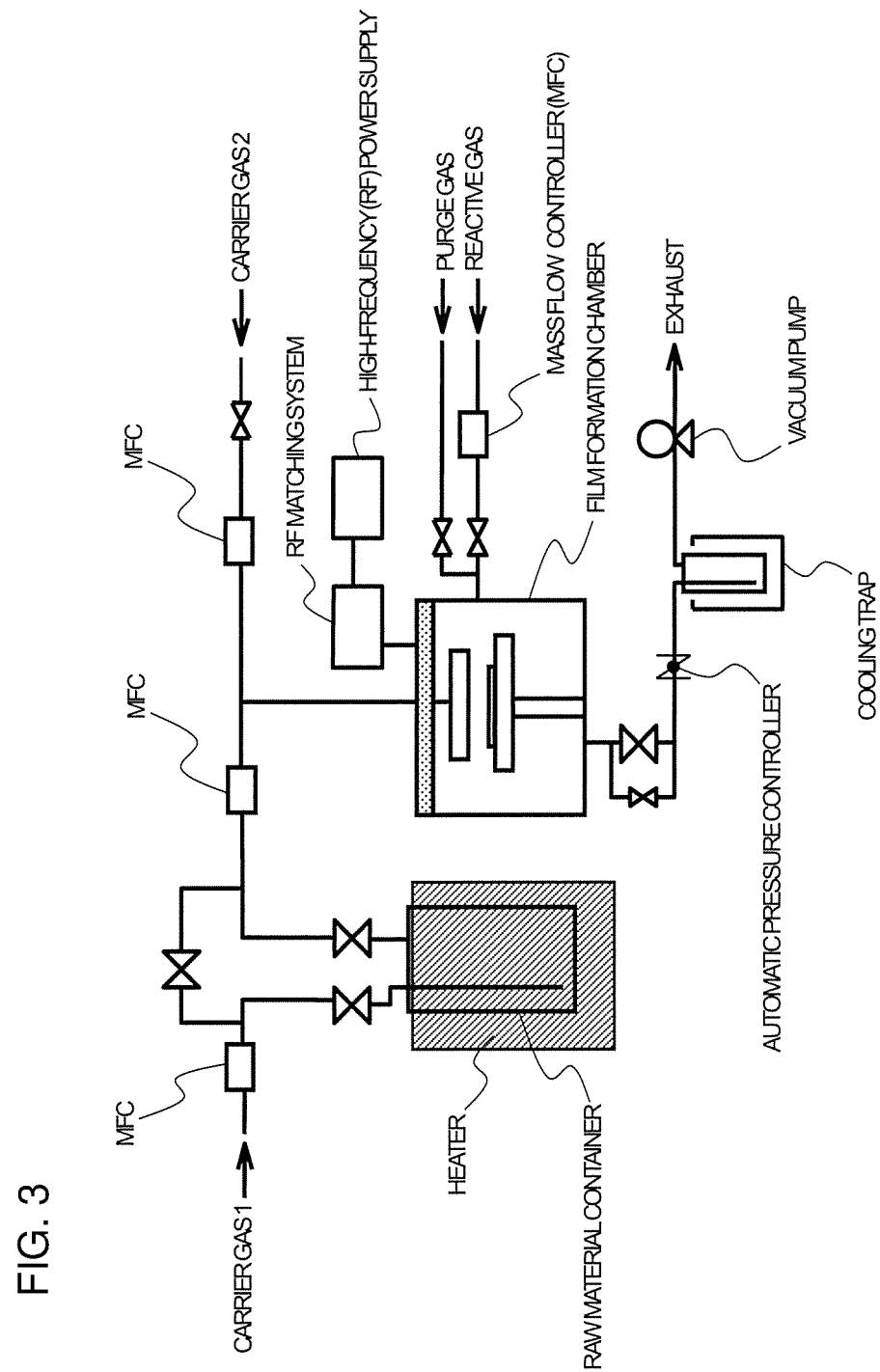
FIG. 3 is a schematic diagram for illustrating still another example of the apparatus for an atomic layer deposition method to be used in the method of producing a thin-film according to the present invention.
Figure 4:
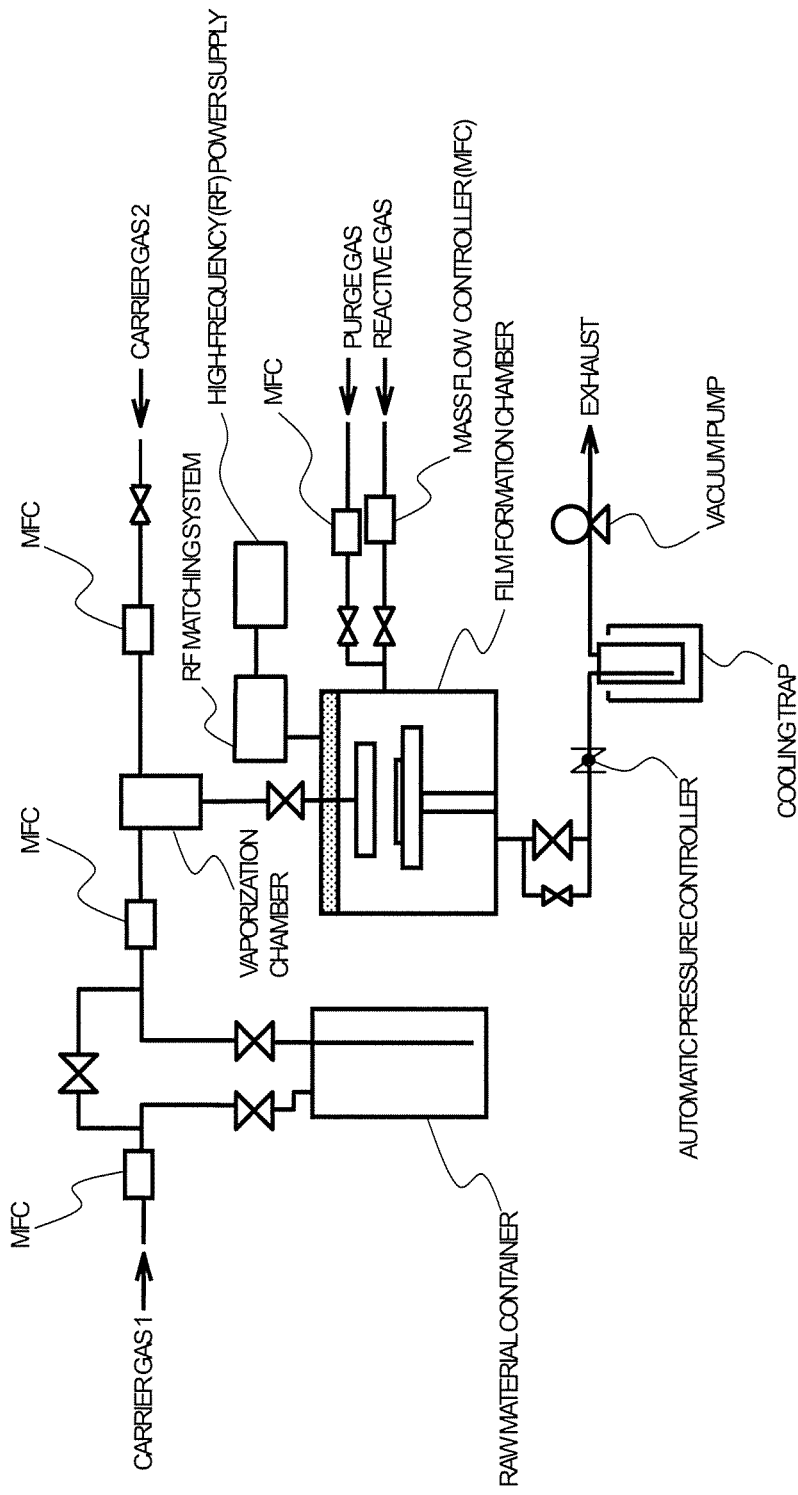
FIG. 4 is a schematic diagram for illustrating yet still another example of the apparatus for an atomic layer deposition method to be used in the method of producing a thin-film according to the present invention.

A well-known apparatus for an atomic layer deposition method may be used as an apparatus for producing a thin-film through use of the thin-film forming raw material, which is used in an atomic layer deposition method, of the present invention. Specific examples of the apparatus include an apparatus capable of performing bubbling supply of a precursor as illustrated in FIG. 1 and an apparatus including a vaporization chamber as illustrated in FIG. 2. Another example of the apparatus is an apparatus capable of subjecting the reactive gas to plasma treatment as illustrated in FIG. 3 and FIG. 4. The apparatus is not limited to single-substrate type apparatus as illustrated in FIG. 1 to FIG. 4, and an apparatus capable of simultaneously processing a large number of substrates through use of a batch furnace may also be used.

The thin-film produced by using the thin-film forming raw material, which is used in an atomic layer deposition method, of the present invention can be provided as desired kinds of thin-films made of, for example, a metal, an oxide ceramic, a nitride ceramic, and glass by appropriately selecting the other precursor, the reactive gas, and the production conditions. The thin-films have been known to show, for example, electrical characteristics and optical characteristics, and hence have been applied to various applications. For example, those thin-films have been widely used in the production of, for example, an electrode material for a memory element typified by a DRAM element, a resistance film, a diamagnetic film used in the recording layer of a hard disk, and a catalyst material for a polymer electrolyte fuel cell.

EXAMPLES

Now, the present invention is described in more detail by way of Examples, Evaluation Example, and Comparative Example. However, the present invention is not limited to the following Examples and the like.

[Example 1] Synthesis of Compound No. 3

50 Grams (0.131 mol) of yttrium nitrate hexahydrate and 200 mL of methanol were loaded into a 1-liter four-necked flask, and were stirred under room temperature. A solution prepared by using 89.6 g (0.392 mol) of 2,2-dimethyl-6-ethyl-3,5-decanedione, 15.67 g (0.392 mol) of sodium hydroxide, and 300 mL of methanol was dropped into the flak under room temperature. After the mixture had been stirred at room temperature for 19 hours, the solvent was removed from the resultant suspension, and 500 mL of dehydrated toluene was added to the residue, followed by dehydration with a Dean-Stark apparatus at 125° C. The solvent was removed from the resultant solution, and 500 mL of dehydrated hexane was added to the residue, followed by stirring under heating at 60° C. for 1 hour. After that, the mixture was filtered. The solvent was removed from the resultant filtrate, and the produced yttrium complex was distilled at a bath temperature of 210° C. and a pressure of 44 Pa to provide Compound No. 3 as a yellow and transparent viscous liquid (yield: 82.03 g, percent yield: 82.1%).

Analytic Values (1) Normal-Pressure TG-DTA
    50% mass loss temperature: 305° C. (760 Torr, Ar flow rate: 100 mL/min, temperature increase rate: 10° C./min, sample amount: 9.860 mg)
(2) Reduced-Pressure TG-DTA
    50% mass loss temperature: 215° C. (10 Torr, Ar flow rate: 50 mL/min, temperature increase rate: 10° C./min, sample amount: 9.716 mg)
(3) $^1$H-NMR (Deuterated Benzene)
    0.91-0.97 ppm (6H, multiplet), 1.18 ppm (9H, singlet), 1.26-1.48 ppm (6H, multiplet), 1.71-1.78 ppm (2H, multiplet), 2.07-2.14 ppm (1H, multiplet), 5.76 ppm (1H, singlet)
(4) Elemental Analysis (Metal Analysis: ICP-AES)
    Yttrium content: 11.6 mass % (theoretical value: 11.6 mass %)

Evaluation Example

Compound No. 3 obtained in Example 1 and Comparative Compound 1 below were each subjected to the following evaluations. In Comparative Compound 1 below, "tBu" represents a tert-butyl group.
(1) Melting Point Evaluation
    The state of each of the compounds at 20° C. was visually observed. When the compound was a solid at 20° C., its melting point was measured with a minute melting point-measuring device. The results are shown in Table 1.
(2) Thermal Stability Evaluation
    The thermal decomposition starting temperature of each of the compounds was measured with a DSC measuring device. A compound having a high thermal decomposition starting temperature can be judged to be preferred as a thin-film forming raw material, which is used in an atomic layer deposition method, because its thermal decomposition hardly occurs. The results are shown in Table 1.

Comparative Compound 1

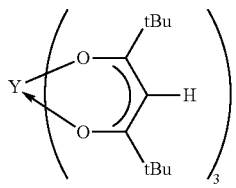

TABLE 1

| Compound | State at 20° C. | Melting point [° C.] | Thermal decomposition starting temperature [° C.] |
|---|---|---|---|
| Evaluation Example 1 | No. 3 | Liquid | — | 415 |
| Comparative Evaluation Example 1 | Comparative Compound 1 | Solid | 170 | 405 |

It was found from the results of Table 1 that Compound No. 3 was a compound having a melting point lower than that of Comparative Compound 1 by 150° C. or more. In addition, it was found that Compound No. 3 had thermal stability higher than that of Comparative Compound 1. It was found that Compound No. 3 was drastically suitable as a thin-film forming raw material, which was used in an atomic layer deposition method, as compared to Comparative Compound 1 having a similar structure.

[Example 2] Production of Yttrium Oxide Thin-Film

An yttrium oxide thin-film was produced on a silicon wafer by the ALD method under the following conditions through use of the apparatus illustrated in FIG. 1 with Compound No. 3 being used as a thin-film forming raw material, which was used in an atomic layer deposition method. When the composition of the obtained thin-film was checked by X-ray photoelectron spectroscopy, the obtained thin-film was yttrium oxide, and its residual carbon content was less than 1.0 atom %. In addition, when film thicknesses were measured by an X-ray reflectivity method, and the average value thereof was calculated, the average film thickness was 15.0 nm, and the average film thickness obtained per cycle was 0.05 nm.
(Conditions)
Substrate: silicon wafer, reaction temperature (silicon wafer temperature): 300° C., reactive gas: ozone
A series of steps including the following (1) to (4) was defined as one cycle, and this cycle was repeated 300 times.
(1) A raw material gas obtained by vaporization under the conditions of a raw material container temperature of 200° C. and a raw material container internal pressure of 100 Pa was introduced into a film formation chamber and deposited at a system pressure of 100 Pa for 10 seconds.
(2) The raw material gas that was not deposited was removed through argon purging for 15 seconds.
(3) A reactive gas was introduced into the film formation chamber and subjected to a reaction at a system pressure of 100 Pa for 10 seconds.
(4) An unreacted reactive gas and a by-product gas were removed through argon purging for 15 seconds.

[Comparative Example 1] Production of Yttrium Oxide Thin-Film

An yttrium oxide thin-film was produced under the same conditions as those of Example 2 except that Comparative Compound 1 was used as a thin-film forming raw material, which was used in an atomic layer deposition method. When the composition of the obtained thin-film was checked by X-ray photoelectron spectroscopy, the obtained thin-film was yttrium oxide, and its residual carbon content was 3.0 atom %. In addition, when film thicknesses were measured by an X-ray reflectivity method, and the average value thereof was calculated, the average film thickness was 9.0 nm, and the average film thickness obtained per cycle was 0.03 nm.

It was found from the results of Example 2 and Comparative Example 1 that in Example 2, the film thickness obtained per cycle was 1.6 or more times as large as that in Comparative Example 1, and a high-quality yttrium oxide thin-film reduced in residual carbon content was able to be obtained with high productivity.

It can be said from the foregoing that according to the present invention, a high-quality yttrium oxide thin-film can be produced with high productivity.

The invention claimed is:

1. A method of producing a thin-film containing an yttrium atom on a surface of a substrate by an atomic layer deposition method, the method comprising the steps of:

causing a yttrium compound in a raw material gas, which is obtained by vaporizing a thin-film forming raw material, which is used in the atomic layer deposition method, to adsorb to the surface of the substrate to form a precursor thin-film; and causing the precursor thin-film to react with a reactive gas in a temperature range of from 200° C. to 400° C. to form the thin-film containing an yttrium atom on the surface of the substrate, wherein the reactive gas is an oxidizing gas containing ozone, oxygen, or water vapor, and wherein the thin-film forming raw material, which is used in the atomic layer deposition method, comprises the yttrium compound, and the yttrium compound is represented by the following general formula (1):

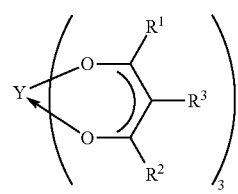

(1)

wherein $R^1$ represents a heptan-2-yl group or a heptan-3-yl group, $R^2$ represents a tertiary alkyl group having 4 carbon atoms, and $R^3$ represents a hydrogen atom.

2. The method of producing a thin-film according to claim 1, wherein the yttrium compound is Yttrium Compound No. 3:

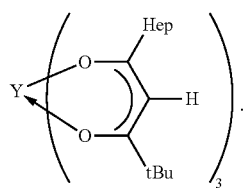

No. 3

* * * * *